(12) United States Patent
Huang et al.

(10) Patent No.: US 7,737,926 B2
(45) Date of Patent: ***Jun. 15, 2010

(54) DYNAMIC LED MATRIX LIGHTING CONTROL USING SCANNING ARCHITECTURE

(75) Inventors: Hsin Chiang Huang, Jhubei (TW); Chang Kuang Chung, Jhubei (TW)

(73) Assignee: Ascend Visual System, Inc., San Jose, CA (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/563,089

(22) Filed: Nov. 24, 2006

(65) Prior Publication Data

US 2008/0122762 A1    May 29, 2008

(51) Int. Cl.
*G09G 3/32* (2006.01)
*H01L 29/18* (2006.01)
*H01L 29/20* (2006.01)
*H05B 37/00* (2006.01)
*H05B 39/00* (2006.01)

(52) U.S. Cl. ............................. 345/82; 345/83; 257/88; 257/89; 315/161
(58) Field of Classification Search ................... 345/82, 345/83; 257/88, 89; 315/161, 169.1
See application file for complete search history.

(56) References Cited

U.S. PATENT DOCUMENTS

| | | | | |
|---|---|---|---|---|
| 5,200,763 A | * | 4/1993 | Tanuma et al. | 347/237 |
| 7,294,970 B2 | * | 11/2007 | Yang | 315/158 |
| 2008/0122764 A1 | * | 5/2008 | Huang et al. | 345/83 |

* cited by examiner

*Primary Examiner*—Bipin Shalwala
*Assistant Examiner*—Ilana Spar
(74) *Attorney, Agent, or Firm*—Ming Chow; Sinorica, LLC (57) ABSTRACT

This invention is a new LED back lighting architecture that each individual LED is controlled by its associated LED drive cell. The LEDs are sequentially connected one after another. A host controller transmits image displaying signals by signal scanning-flows. The current flow for controlling each LED's color lighting is by either binary current flow control or two-steps progressive current flow control.

15 Claims, 8 Drawing Sheets

Fig. 8

DYNAMIC LED MATRIX LIGHTING CONTROL USING SCANNING ARCHITECTURE

FIELD OF INVENTION

This invention relates to a novel backlighting architecture of and lighting control on the Light Emitting Diode (LED). The architecture is a break-through concept of controlling individual LED rather than the traditional controlling on a module with plurality LEDs. This architecture allows much more flexibilities in controlling individual LED's illumination and color saturation. Furthermore, by implementing the current inventive architecture, the current invention implements a signal scanning operation that allows a series control signals flow through each individual LED sequentially. The electric current flow for varying the lighting of each LED is controlled by a binary digital state in accordance with required image signal strength and required LED justifications. Therefore, this invention provides a detail lighting control on the electric current flow to a detail state which can be designated by any possible binary number. In addition, the electric current flow can also be controlled by a two-steps process in a progressive manner by using a Base Current Source (BCS) and adjusted by a Weight Current Source (WCS).

BACKGROUND OF THE INVENTION

The LED has been widely used in lighting display, either color or non-color, for various applications and industries. Although each individual LED is and can be a lighting source, however, all applications have been implementing "LED modules" for controlling purposes. The disadvantages of lighting control at the "LED module" level is that every single LED on the same "LED module" performs the same—in terms of luminance, color saturation, brightness, etc. Also, all applications have been controlling the electric current flow to each "LED module" by circuits that have been physically designed and defined for specified current flow amount. This invention resolves and overcomes the disadvantages as stated above by controlling the current flow to each individual LED. Also, the amount of electric current flow to each LED is controlled to a detail state that any binary number can represent. Alternatively, the electric current flow to each individual LED can also be controlled by a two-steps process in a progressive manner by implementing a BCS and adjusted by a WCS.

SUMMARY OF THE INVENTION

This invention implements the lighting control on single LED instead of controlling on an LED module that has a plurality of single LEDs. The "single-LED lighting control" architecture improves the lighting varieties performed by a LED module down to a detail level of multiple LEDs.

Based on the "single-LED lighting control" architecture, the amount of electric current flow to each individual LED is controlled by a plurality of Replica Current Module (RCM). Each RCM is designated by a binary number (0 or 1) representing either ON or OFF. For a "quantity of n" RCMs, the combination of all RCMs can be represented by a n bits binary number $2^N$. Therefore, the electric current flow to each individual LED can be controlled to a detail of $2^n$ different flow amount. In order to determine the desired current flow amount for each individual LED, there are two determining factors—image data and justification data must be determined first. The image data is an image signal strength indicating the image frame to be displayed by the particular LED. The justification data is a justification factor when a LED is determined to perform either below or beyond expected performance standard. The manufacturing of LED, therefore, reduces its costs significantly that used to maintain each LED's performance as required. By applying justification data to the "single-LED lighting control" architecture allows each LED to perform as required regardless the performance outcome from the manufacturing.

Both the image data and the justification data (if any) are input to at least one logic operators for calculation in order to determine the binary state for controlling the electric current flow to each individual LED.

In addition, the electric current flow to each individual LED can be controlled in a two-step process by both a Base Current Source (BCS) and a Weight Current Source (WCS). The BCS is a predefined amount of electric current flow subject to each application design requirements to each individual LED. The BCS is further adjusted by a WCS in order to vary the predetermined BCS so that the amount of electric current flow to each LED can be various. The two-step electric current flow control can significantly reduce the required RCM and therefore consequently reduce the physical size and the cost.

DETAIL DESCRIPTIONS OF THE INVENTION

Terminology and Lexicography

Justification: A process to remedy the deficiency of a LED's lighting performance. The justification is NULL when the LED has no performance justification is required.

LED: A single or an individual LED has two terminals among which one terminal connects to the voltage source and the other terminal connects to the drive cell.

LED Module: A plurality of LEDs arranged in connections so that all LEDs are controlled by same controllers. Within the plurality of LEDs, there is only one individual LED connects to the voltage source and only one individual LED connects to the drive cell.

Signal scanning-flow: A signal or signals being transmitted through sequentially connected hardware elements.

Drive Cell: A controller controls one single LED. The major function of the Drive Cell is controlling the electric current and voltage to and from the controlled single LED.

Architecture

Figure 1:
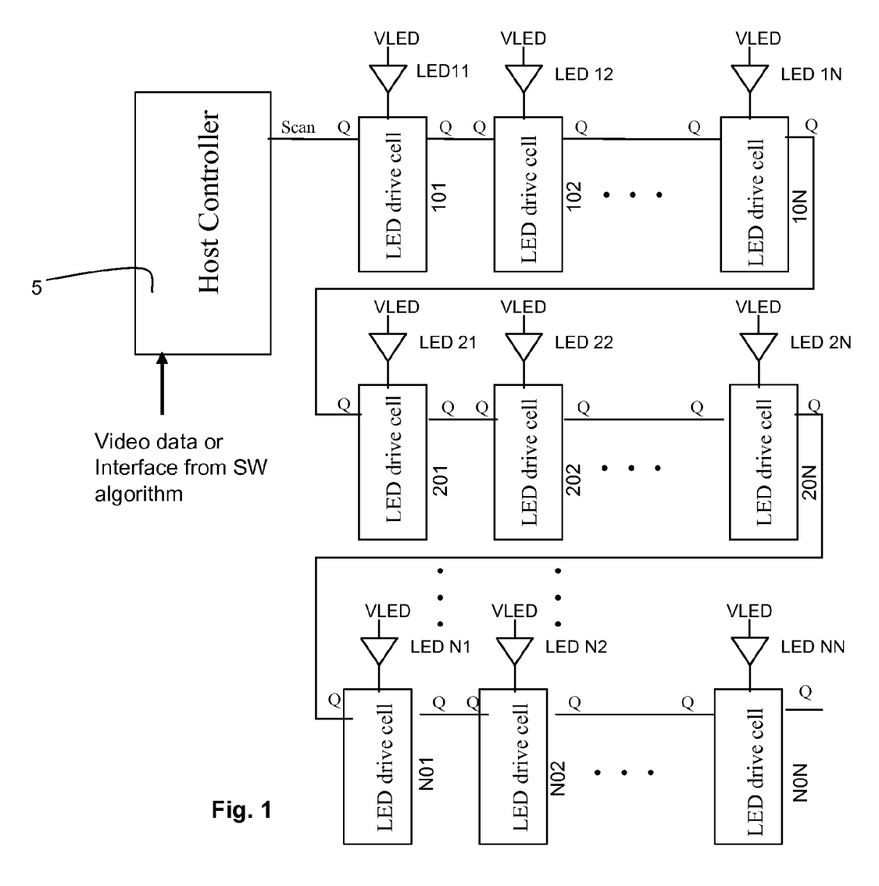
FIG. 1 is an embodiment of LED backlighting architecture.

The FIG. 1 shows a LED lighting control architecture. The lighting control architecture includes a host controller 5, LED drive cells 101, 102, . . . , 10N, 201, 202, . . . , 20N, . . . , N01, N02, . . . , N0N, and LEDs 11, 12 . . . 21, 22 . . . M1, M2 . . .

MN. The host controller is a micro-processor or a digital processor for calculating and recording the image stream data. It provides the required color saturation or luminance information to the LED drive cells. The LED drive cells and the LEDs are arranged in a matrix structure. Each LED is driven by its designated LED drive cell while each LED drive cell is connected sequentially. The host controller transmits all image and control signals to the first LED drive cell that connects to the host controller directly. In response, the first LED transmits the same signal to the second LED drive cell that connects to the first LED drive cell. Sequentially, the signals are transmitted, in a manner of scanning-effect style, from the first drive cell via second, third, fourth, etc drive cells to the last LED drive cell N0N.

Figure 2:
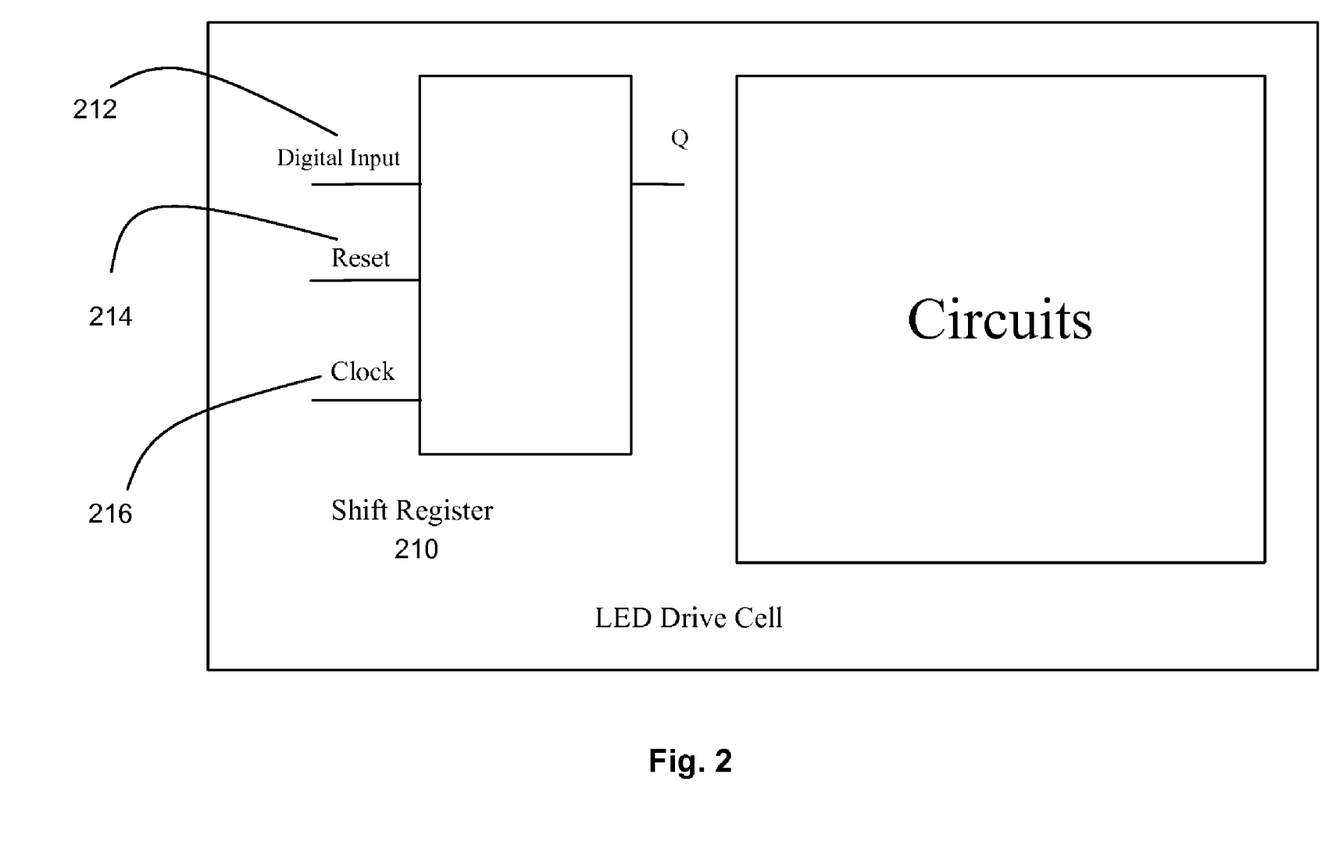
FIG. 2 is a LED drive cell.

The FIG. 2 shows a LED drive cell which includes a shift register 210. The shift register comprises a digital input pin 212, a reset module 214, and a clock module 216. When the lighting system is first initialized, all shift registers of all LED drive cells are reset by a rest signal. The host controller generates a signal to initiate the signal scanning-flow when the clock signal is toggling. The first LED drive cell is enabled when the signal scanning-flow reaches. The shift register of the first LED drive cell is enabled to memorize the state of the first LED and holds the state information until the same image frame information is transmitted to the last LED. Each LED's shift register memorizes the state of its designated LED and maintains the same lighting until the signal flow reaches the last LED. As soon as the current image frame is displayed from the first LED to the last LED, the signal for the next image frame begins and the shift registers reset when the next signal scanning-flow reaches. In other words, each LED's lighting remains the same until the next image frame signal reaches when it requires a lighting change.

Figure 3:
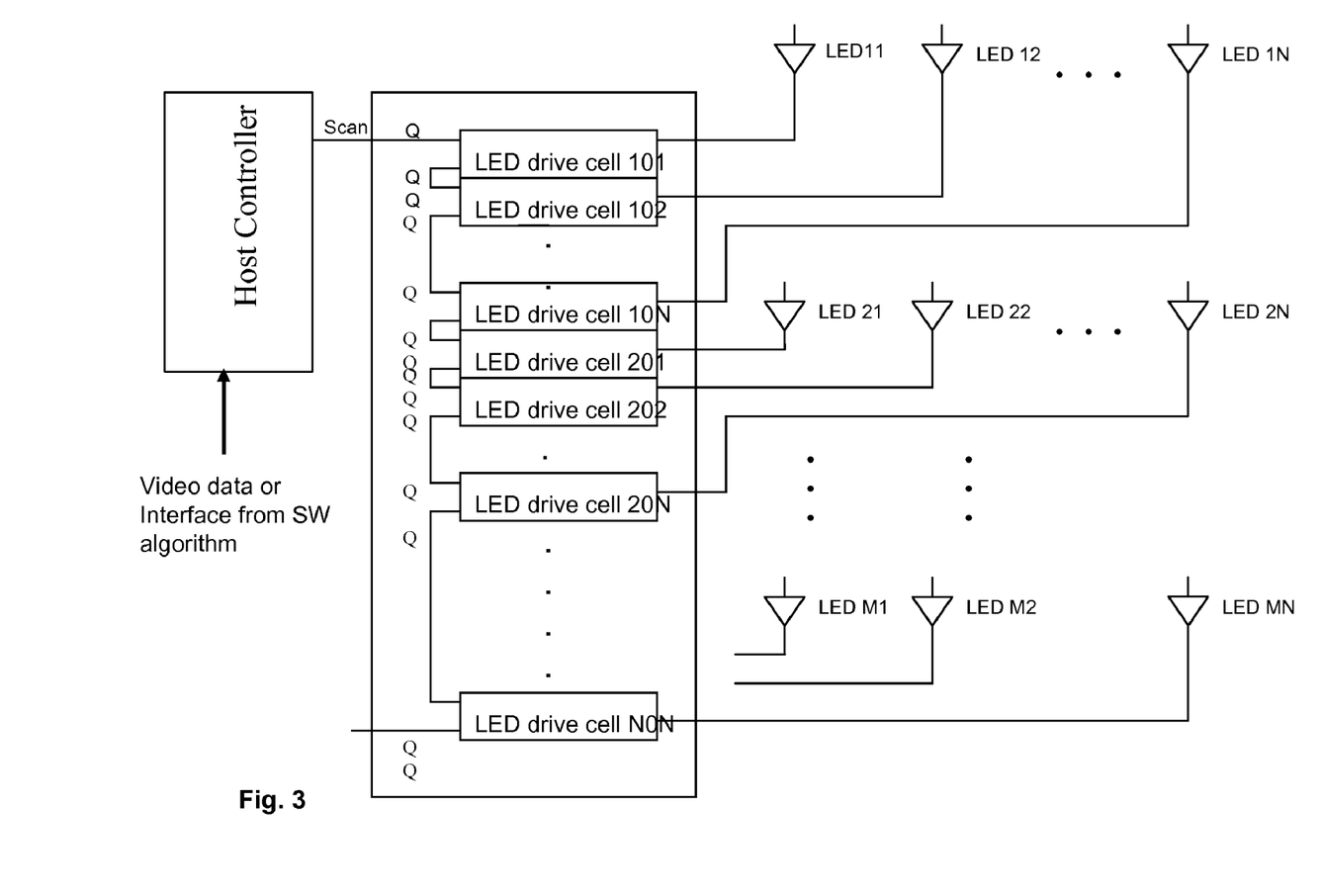
FIG. 3 is an embodiment of LED backlighting architecture with aggregated LED Drive Cells.

The FIG. 3 shows a different embodiment where the LED drive cells are physically aggregated and the signal scanning-flow remains the same as described by FIG. 2.

Figure 4:
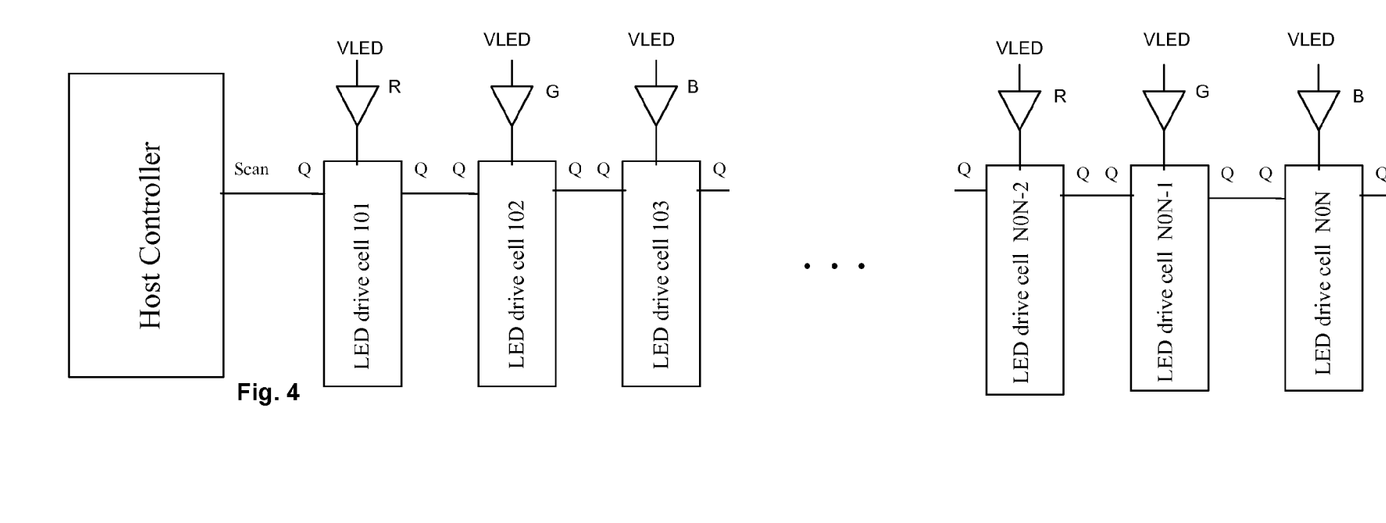
FIG. 4 is an embodiment of LED backlighting architecture with R-G-B alternating arrangement.
Figure 5:
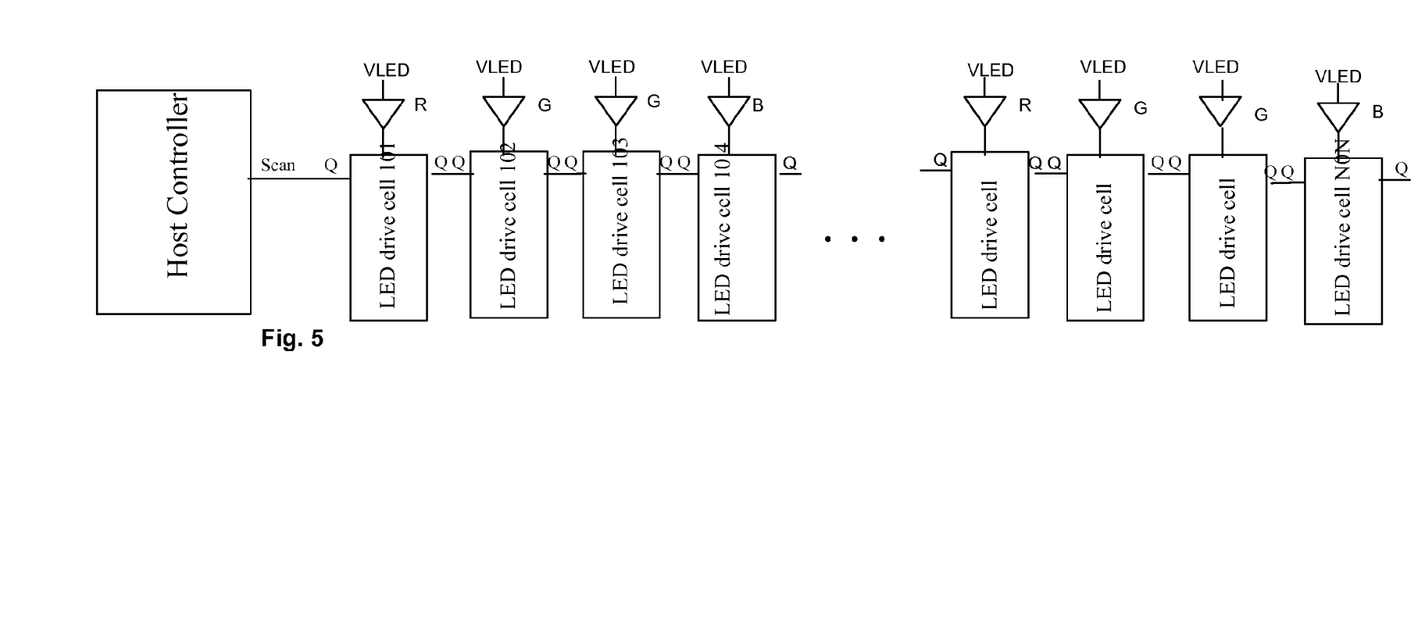
FIG. 5 is an embodiment of LED backlighting architecture with R-G-G-B alternating arrangement.
Figure 6:
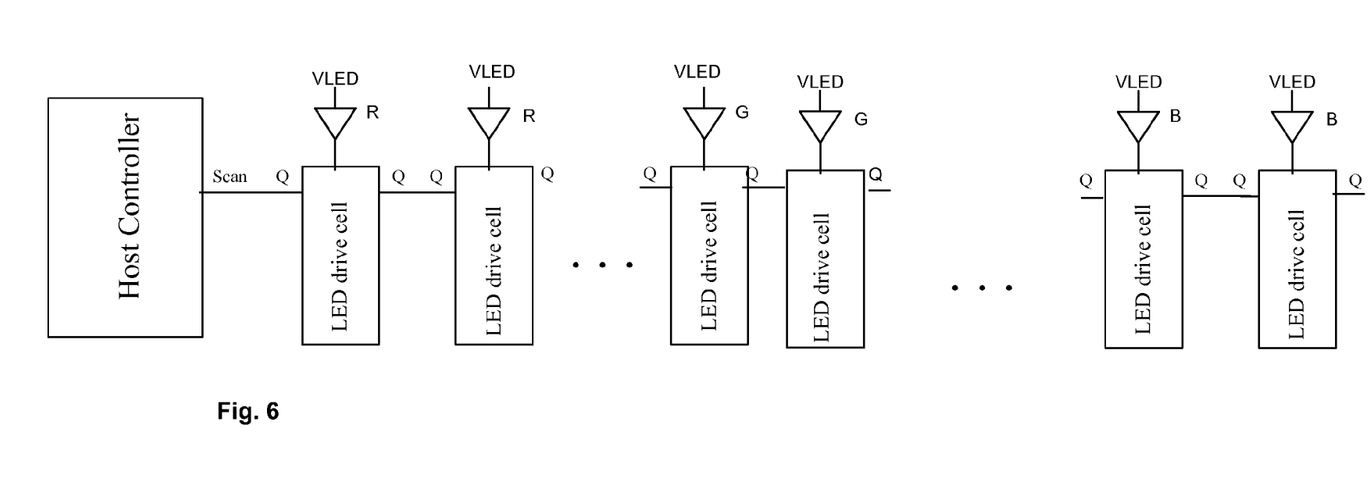
FIG. 6 is an embodiment of LED backlighting architecture with R-R-G-G-B-B alternating arrangement.

The FIG. 4-6 show different embodiments that implement the same signal scanning-flow. However, these embodiments are designed for various color lighting variations. The FIG. 4 shows different color lighting LEDs that are arranged in Red-Green-Blue arrangement. The FIG. 5 shows different color lighting LEDs are arranged in Red-Green-Green-Blue arrangement. The FIG. 6 shows different color lighting LEDs are arranged in Red-Red- . . . -Green-Green- . . . -Blue-Blue- . . . arrangement. These color lighting variations can only be arranged by the architecture of the current invention when the signal scanning-flow is implemented. The lighting arrangements are not limited as the figures illustrated. Other color lighting arrangements can also be arranged according to each application requirements.

Binary Electric Current Flow Control

Figure 7:
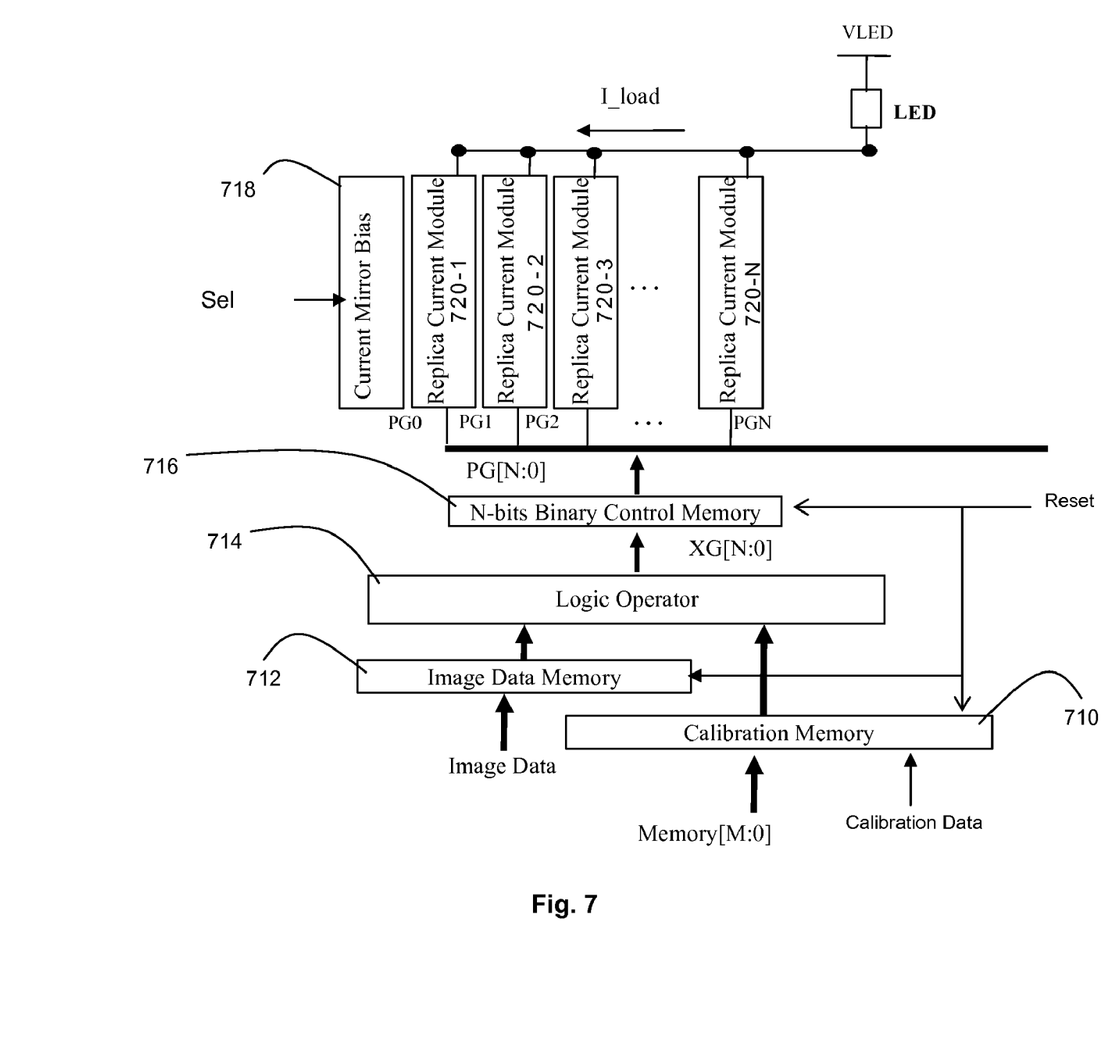
FIG. 7 is an LED Drive Cell architecture for binary electric current flow control.

The FIG. 7 shows the detail configurations of a LED and its LED drive cell. The LED drive cell comprises at least one Justification Memory 710 (the figure shows only one), at least one Image Data Memory 712 (the figure shows only one), at least one Logic Operator 714 (the figure shows only one), at least one Binary Flow Control Memory 716 (the figure shows only one), at least one Current Mirror Bias 718 (the figure shows only one), and a plurality of Replica Current Modules 720-1, 720-2, 720-3, . . . 720-$n$.

The host controller transmits justification data signals to the at least one Justification Memory when the LED is required to have performance justification. The justification data signals are used to compensate the performance of degraded LED to achieve the desired lighting requirements. The host controller also transmits image data to the at least one Image Data Memory. The image data represents the to-be-displayed image lighting strength. In response to receiving the image data and the justification data signals, the at least one Logic Operator calculates, in accordance with a pre-defined logic, the image data and the justification data, to conclude a binary lighting state representation. This binary state representation, based on application requirements and the required Replica Current Modules, is a $2^{n+1}$ binary number where n is the number of Replica Current Modules. Each bit of the binary number (0 or 1) corresponds to a Replica Current Module indicating either ON (allowance) or OFF (disallowance) of the current flow to the corresponding Replica Current Module. When there are n (quantity) Replica Current Modules the possible current flow states are $2^{n+1}$ (two to the $[n+1]^{th}$ power of different states). In other words, the amount of current flow through the Replica Current Modules to the LED may vary for $2^{n+1}$ different amount current flows. The lighting variations of each specific LED, therefore, can achieve $2^{n+1}$.

Two-Step Electric Current Flow Control

Figure 8:
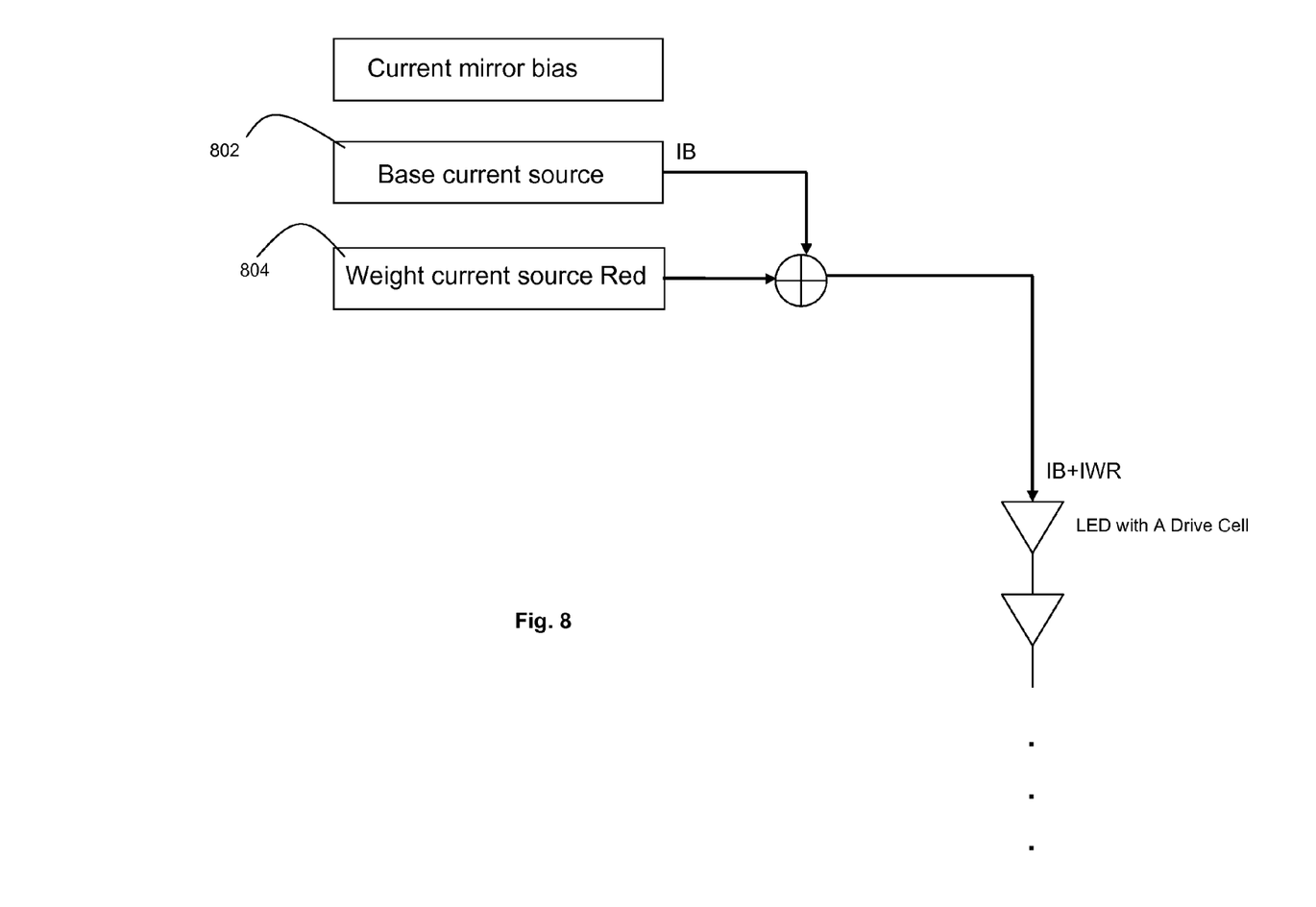
FIG. 8 is an arrangement for two-step electric current flow control.

The FIG. 8 shows electric current flow to each LED is controlled by a two-step progressive process. The LED Drive Cell is input with two current sources—a Base Current Source 802 and a Weight Current Source 804. The BCS is a predefined amount of current flow based on the application requirements. This BCS applies to every LED with the same amount of current flow. In order to justify various color lighting requirements, a WCS is input to adjust the amount of current flow from the BCS. The WCS changes through each image frame to be displayed. This electric current flow control reduces significantly the physical hardware spaces and costs for the RCMs that are required by the embodiment shown on FIG. 7.

The invention claimed is:

1. A Light Emitting Diode (LED) lighting control system comprising:
    a plurality of LEDs wherein electronic current flow to each individual LED of said plurality of LEDs is controlled by separate LED drive cell;
    lighting color of said each individual LED is selected from the group consisting of red, green, and blue;
    said each separated LED drive cell comprises a shift register wherein the each shift register stores lighting status of the LED controlled by said LED drive cell;
    the lighting status is stored until a different displaying signal is received by the LED drive cell;
    said each LED drive cell is sequentially connected one after another wherein only one lead LED drive cell connects to the host controller;
    the host controller transmits displaying signals to the lead LED drive cell;
    the displaying signals are transmitted to said each individual LED as signal scanning-flow;
    said each LED drive cell comprises at least one replica current module, and at least one justification memory, and at least one image data memory, and at least one logic operator, and at least one binary control memory;
    said host controller transmits LED justification data to the at least one justification memory; and
    said host controller transmits displaying data to the at least one image data memory.

2. The LED lighting control system of claim 1, wherein
    the at least one logic operator executes calculations on the justification data and the displaying data in accordance with a predefined logic expression; and in response to the calculations the logic operator generates a N bits binary number, wherein the N is a predefined quantity of the at least one replica current module.

3. The LED lighting control system of claim 2, wherein a binary number of each of the N bits indicates allowance or disallowance of electric current flow to said each individual LED.

4. The LED lighting control system of claim 1, wherein a predefined amount of electric current flow is input to said each LED drive; and in response of the input, an adjusting electric current flow is input to said each LED drive to alter the predefined amount of electric current flow.

5. A Light Emitting Diode (LED) lighting control system comprising:
   a plurality of LEDs; and
   a plurality of LED drive cells wherein each LED drive cell of the plurality of LED drive cells connects to different LED; and
   said each LED drive cell is sequentially connected one after another wherein only one lead LED drive cell connects to the host controller;
   said each LED drive cell comprises at least one replica current module, and at least one justification memory, and at least one image data memory, and at least one logic operator, and at least one binary control memory;
   said host controller transmits LED justification data to the at least one justification memory; and
   said host controller transmits displaying data to the at least one image data memory.

6. The LED lighting control system of claim 5, wherein electronic current flow to each individual LED of said plurality of LEDs is controlled by separate LED drive cell; and
   the host controller transmits displaying signals to the lead LED drive cell; and
   the displaying signals are transmitted to said each individual LED as signal scanning-flow.

7. The LED lighting control system of claim 6, wherein lighting color of said each individual LED is selected from the group consisting of red, green, and blue; and
   said each LED drive cell comprises a shift register wherein the shift register stores lighting status of the LED controlled by said each LED drive cell; and
   the lighting status is stored until a different displaying signal is received by the LED drive cell wherein the lighting status is stored.

8. The LED lighting control system of claim 7, wherein the at least one logic operator executes calculations on the justification data and the displaying data in accordance with a predefined logic expression; and
   in response to the calculations the logic operator generates a N bits binary number, wherein the N is a predefined quantity of the at least one replica current module.

9. The LED lighting control system of claim 8, wherein a binary number of each of the N bits indicates allowance or disallowance of electric current flow to said each individual LED.

10. The LED lighting control system of claim 7, wherein a predefined amount of electric current flow is input to said each LED drive; and
    in response of the input, an adjusting electric current flow is input to said each LED drive to alter the predefined amount of electric current flow.

11. A Light Emitting Diode (LED) lighting control system comprising:
    a plurality of LEDs wherein electronic current flow to each individual LED of said plurality of LEDs is controlled by separate LED drive cell;
    said each LED drive cell comprises at least one replica current module, and at least one justification memory, and at least one image data memory, and at least one logic operator, and at least one binary control memory; and
    said host controller transmits LED justification data to the at least one justification memory; and
    said host controller transmits displaying data to the at least one image data memory.

12. The LED lighting control system of claim 11, wherein the at least one logic operator executes calculations on the justification data and the displaying data in accordance with a predefined logic expression; and
    in response to the calculations the logic operator generates a N bits binary number, wherein the N is a predefined quantity of the at least one replica current module.

13. The LED lighting control system of claim 12, wherein a binary number of each of the N bits indicates allowance or disallowance of electric current flow to said each individual LED.

14. The LED lighting control system of claim 11, wherein a predefined amount of electric current flow is input to said each LED drive; and
    in response of the input, an adjusting electric current flow is input to said each LED drive to alter the predefined amount of electric current flow.

15. The LED lighting control system of claim 11, wherein said each LED drive cell is sequentially connected one after another wherein only one lead LED drive cell connects to the host controller; and
    the host controller transmits displaying signals to the lead LED drive cell; and
    the displaying signals are transmitted to said each individual LED as signal scanning-flow; and
    lighting color of said each individual LED is selected from the group consisting of red, green, and blue; and
    said each LED drive cell comprises a shift register wherein the shift register stores lighting status of the LED controlled by said each LED drive cell; and
    the lighting status is stored until a different displaying signal is received by the LED drive cell wherein the lighting status is stored.

* * * * *